J. R. JACKSON.
AUTOMOBILE LOCK.
APPLICATION FILED APR. 25, 1916.

1,223,052.

Patented Apr. 17, 1917.

WITNESSES:
C. S. Evans
J. B. Gardner.

INVENTOR
JOHN R. JACKSON
BY White & Frost
his ATTORNEYS.

UNITED STATES PATENT OFFICE.

JOHN R. JACKSON, OF SAN FRANCISCO, CALIFORNIA, ASSIGNOR TO ALBERT G. BURNS, OF ALAMEDA, CALIFORNIA.

AUTOMOBILE-LOCK.

1,223,052.

Specification of Letters Patent.

Patented Apr. 17, 1917.

Application filed April 25, 1916. Serial No. 93,396.

*To all whom it may concern:*

Be it known that I, JOHN R. JACKSON, a citizen of the United States, and a resident of the city and county of San Francisco, State of California, have invented a new and useful Automobile-Lock, of which the following is a specification.

My invention relates to an automobile lock.

An object of my invention is to provide a lock wherewith the fuel and throttle levers of an automobile may be rendered inoperative.

Another object of the invention is to provide means for locking the steering wheel of an automobile against rotation and at the same time blocking the operation of the control levers.

Another object of the invention is to provide an automobile lock of simple construction, easy to apply and remove and which serves to prevent the operation of the automobile when it is secured in place.

The invention possesses other features of advantage, some of which, with the foregoing, will be set forth in the following description of the preferred form of my invention, which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings.

Figure 2:
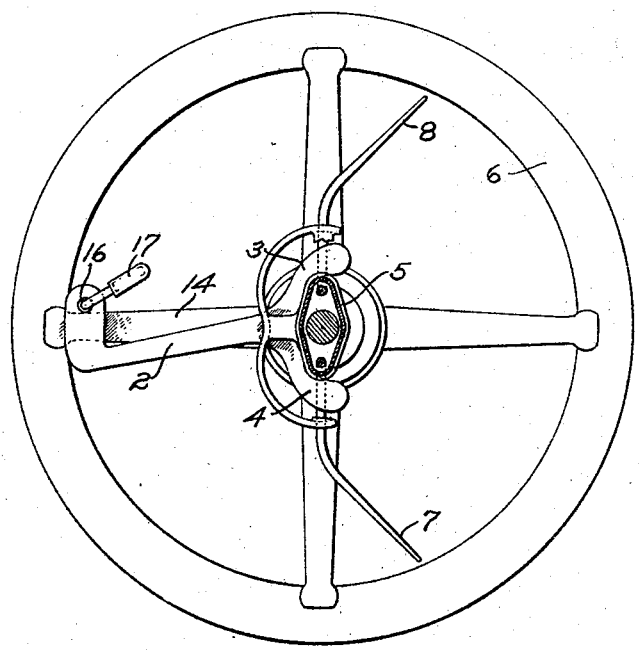
Fig. 2 is a sectional view through the steering post taken on the line 2—2 of Fig. 1.
Figure 1:
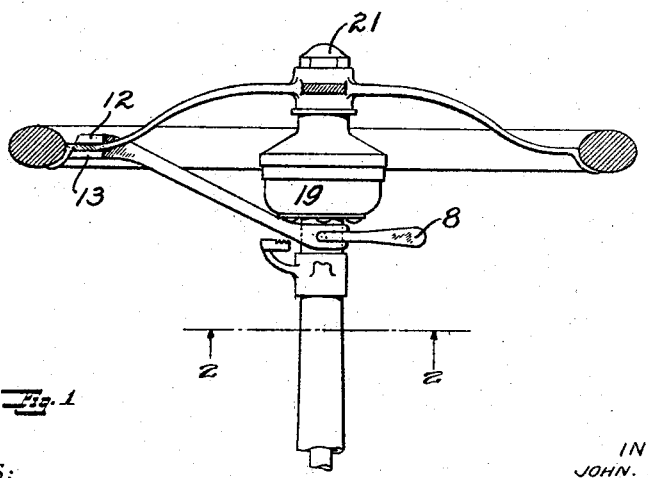
Figure 1 is an elevation partly in section of the steering post and wheel of an automobile showing the lock in place.

The automobile lock of my invention consists of a bar 2 having the forking arms 3 and 4 at one end which are so formed as to span the steering post 5 when the lock is placed in position below the steering wheel 6. The ends of the forking arms 3 and 4 are grooved and when the lock is in position the control levers 7 and 8 lie in these grooves and their operation is blocked until the locking bar is removed. Means are provided on the bar for locking it in position upon the control levers. The end of the bar opposite the forked end is turned at an angle to the body of the bar and grooved or bifurcated into two short arms 12 and 13. The depth of the groove is greater than the width of the spokes 14 of the steering wheel and at their outer ends the arms 12 and 13 are provided with alined apertures 16 adapted to receive therethrough a padlock 17.

In the embodiment of my invention which I have shown in the drawings, the control levers are some little distance below the plane of the steering wheel rim, and for this reason I have found it preferable to make the locking bar of curved or bent form, the grooved end 12—13 and the forked end lying in different planes.

Preferably the grooved end 12—13 is made rather wide in the horizontal plane so that when the bar is in place the area of engagement with the spoke of the wheel is relatively wide. The shape of the forked end of the bar is such that it contacts with the lower surface of the casing 19 when it is in position. From this it is seen that even though the nut 21 of the steering wheel is removed, the wheel cannot be raised to disengage the bar from the levers 7 and 8; that is, the shape of the bar in relation to the members with which it coacts is such that when the forking arms are set upon the control levers, the upper side of the bar contacts with the casing 19 which prevents the outer edge from being raised past the plane of the rim of the wheel.

In locking an automobile with my locking bar, the control levers are pushed back into their inoperative position. The forked end of the bar is then pushed into place with the control levers lying in the grooves of the arms 3 and 4 of the fork. The outer end of the bar is next raised and the steering wheel turned to bring one of the spokes within the groove between the members 12 and 13. By inserting a padlock in the apertures 16, the bar is locked in position and prevents the operation of either the control levers or the steering wheel.

I claim:

1. In combination with the steering wheel and control levers of an automobile, a bar having a forked end adapted to be mounted upon and to block the movement of the control levers and a grooved end adapted to be locked upon the said steering wheel.

2. In combination with the steering post, steering wheel and control levers of an automobile, a forked bar adapted to span the steering post, the ends of said forks being grooved to engage and be supported by the said levers, said bar being adapted at its other end to be placed in locked engagement with the steering wheel.

3. In combination with the steering wheel, steering post and control levers of an automobile, a bar having a forked end adapted to block the movement of the control levers and a grooved end adapted to be locked upon said steering wheel, said bar being formed to contact with a portion of said steering post to prevent an upward movement of its outer end past the plane of said wheel.

In testimony whereof, I have hereunto set my hand at San Francisco, California, this 18th day of April 1916.

JOHN R. JACKSON.

In presence of—
C. S. EVANS.

Copies of this patent may be obtained for five cents each, by addressing the "Commissioner of Patents, Washington, D. C."